United States Patent [19]
Wakamiya

[11] Patent Number: 4,606,615
[45] Date of Patent: Aug. 19, 1986

[54] BEHIND STOP LENS

[75] Inventor: Koichi Wakamiya, Tokyo, Japan

[73] Assignee: Nippon Kogaku K.K., Tokyo, Japan

[21] Appl. No.: 549,326

[22] Filed: Nov. 7, 1983

[30] Foreign Application Priority Data

Nov. 18, 1982 [JP] Japan .............. 57-202442

[51] Int. Cl.$^4$ .............................................. G02B 9/14
[52] U.S. Cl. ...................................................... 350/476
[58] Field of Search ........................................ 350/476

[56] References Cited

U.S. PATENT DOCUMENTS 3,953,112  4/1976  Imai .................... 350/476
4,192,579  3/1980  Hyakumura ........... 350/476

FOREIGN PATENT DOCUMENTS 0121010  7/1983  Japan .................. 350/476

*Primary Examiner*—John K. Corbin
*Assistant Examiner*—P. M. Dzierzynski
*Attorney, Agent, or Firm*—Shapiro and Shapiro

[57]  ABSTRACT

A behind stop lens has, in succession from the object side, a first lens which is a positive meniscus lens having its convex surface facing the object side, a second lens which is a biconcave negative lens, a third lens which is a biconvex positive lens, and a fourth lens which is a negative meniscus lens having its convex surface facing the image side, the third lens and the fourth lens being cemented together to form a positive cemented lens. The behind stop lens satisfies the following conditions:

$$\Sigma d < 0.29f \quad (1)$$
$$0.05 < n_3 - n_4 < 0.18 \quad (2)$$
$$-0.35f < r_6 < -0.22f \quad (3)$$
$$0.57f < r_5 < 0.73f \quad (4)$$
$$\nu_4 - \nu_3 > 6 \quad (5)$$

$$\left.\begin{array}{c} 48.0 < \nu_3 < 49.6 \\ 30.0 < \nu_2 < 33.0 \end{array}\right\} \quad (6)$$

$$0.25f < r_1 < 0.31f \quad (7)$$
$$-0.38f < f_2 < -0.30f \quad (8)$$

where f represents the total focal length of the entire system, $\Sigma d$ represents the distance from the vertex of the object side lens surface of the first lens to the vertex of the image side lens surface of the fourth lens, $f_2$ represents the focal length of the second lens, r represents the radius of curvature of each lens surface, n and $\nu$ represent the refractive index and the Abbe number, respectively, of each lens, and the subscript numbers mean the order from the object side.

6 Claims, 5 Drawing Figures

BEHIND STOP LENS

BACKGROUND OF THE INVENTION

1. Field of the Invention

This invention relates to improvements in a modified Tessar type behind stop lens used in a compact camera or the like and having an angle of view of 60° or more and brightness of the order of F3.5.

2. Description of the Prior Art

As a behind stop lens used in a compact camera and having an angle of view of 60° or more and brightness of the order of F3.5, there is known a Tessar type lens and a modified Tessar type lens in which the direction of the cemented surface of a cemented lens which is a third group has been changed. Since, however, the stop is positioned rearwardly of the lens, the principal light ray of the oblique light flux passing through the center of the stop passes through a position very far from the optical axis in the neighborhood of the first lens group which is most adjacent to the object side, and this leads to a structure in which various aberrations are liable to occur. Due, due to the fact that the lower light flux relative to the principal light ray of the oblique light flux passes through a point relatively near the center of the stop, it performs an especially important role in the imaging performance of the photographic lens. Nevertheless, the lower light flux relative to the principal light ray passes through the marginal portion of the forward lens and therefore, substantial coma, chromatic aberration of coma and astigmatism have occurred, and it has been difficult to reduce these aberrations sufficiently at the same time.

SUMMARY OF THE INVENTION

It is an object of the present invention to overcome the above-noted disadvantage and to provide a behind stop lens having an angle of view of 60° or more and brightness of the order of F3.5 in which a reduction in the aberrations of the lower light flux relative to the principal light ray of the oblique light flux is achieved and yet good aberration balance as a whole is maintained.

The invention will become fully apparent from the following detailed description thereof taken in conjunction with the accompanying drawings.

DESCRIPTION OF THE PREFERRED EMBODIMENTS

Figure 1:
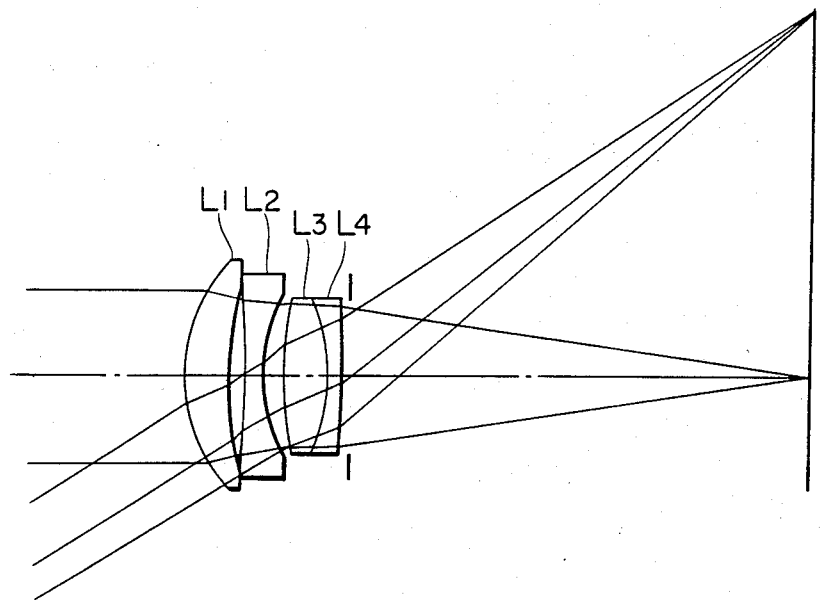
FIG. 1 shows the construction of the lens of the present invention.
Figure 2:
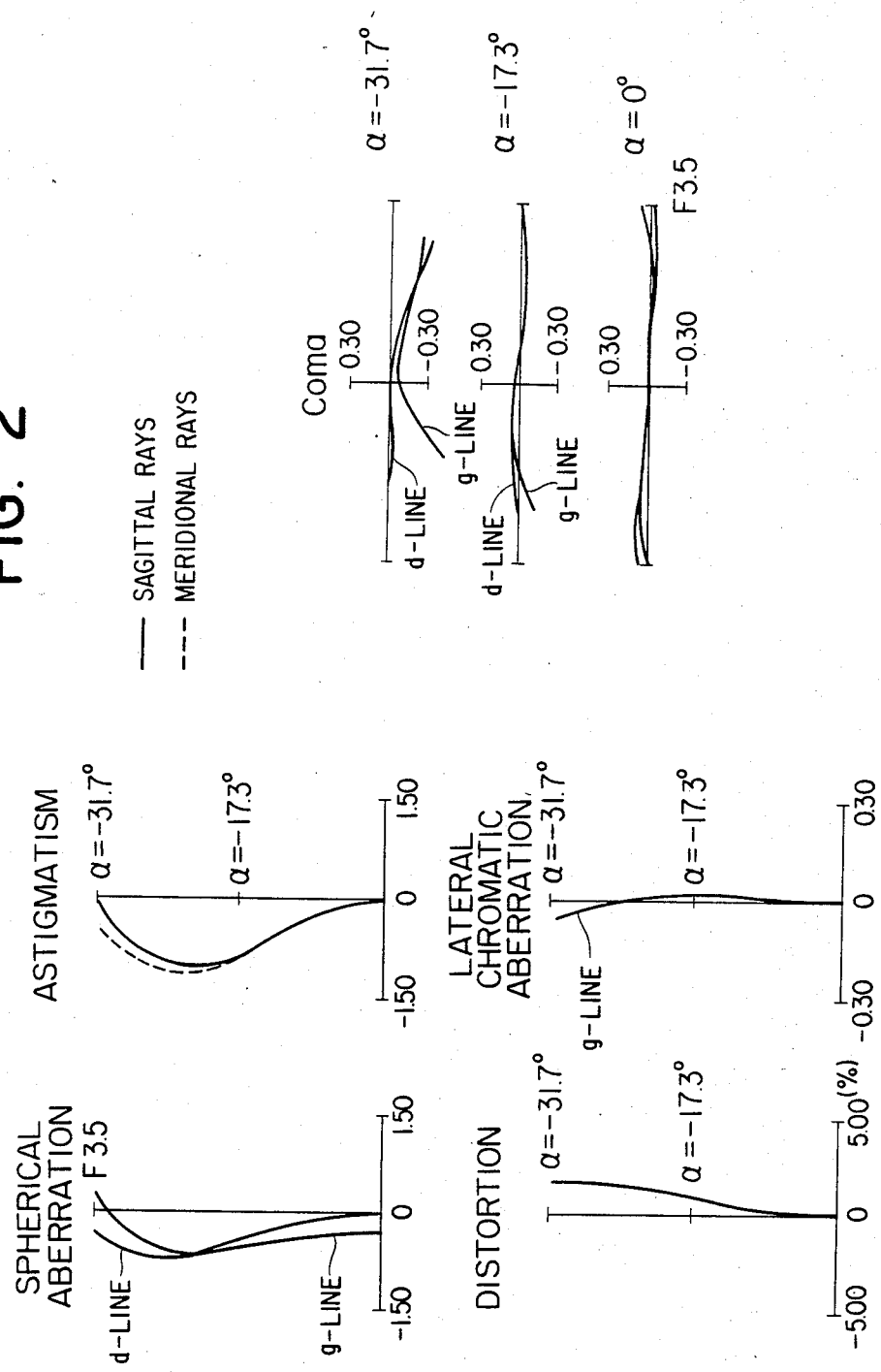
FIGS. 2 to 5 show the various aberrations in first to fourth embodiments of the present invention.
Figure 3:
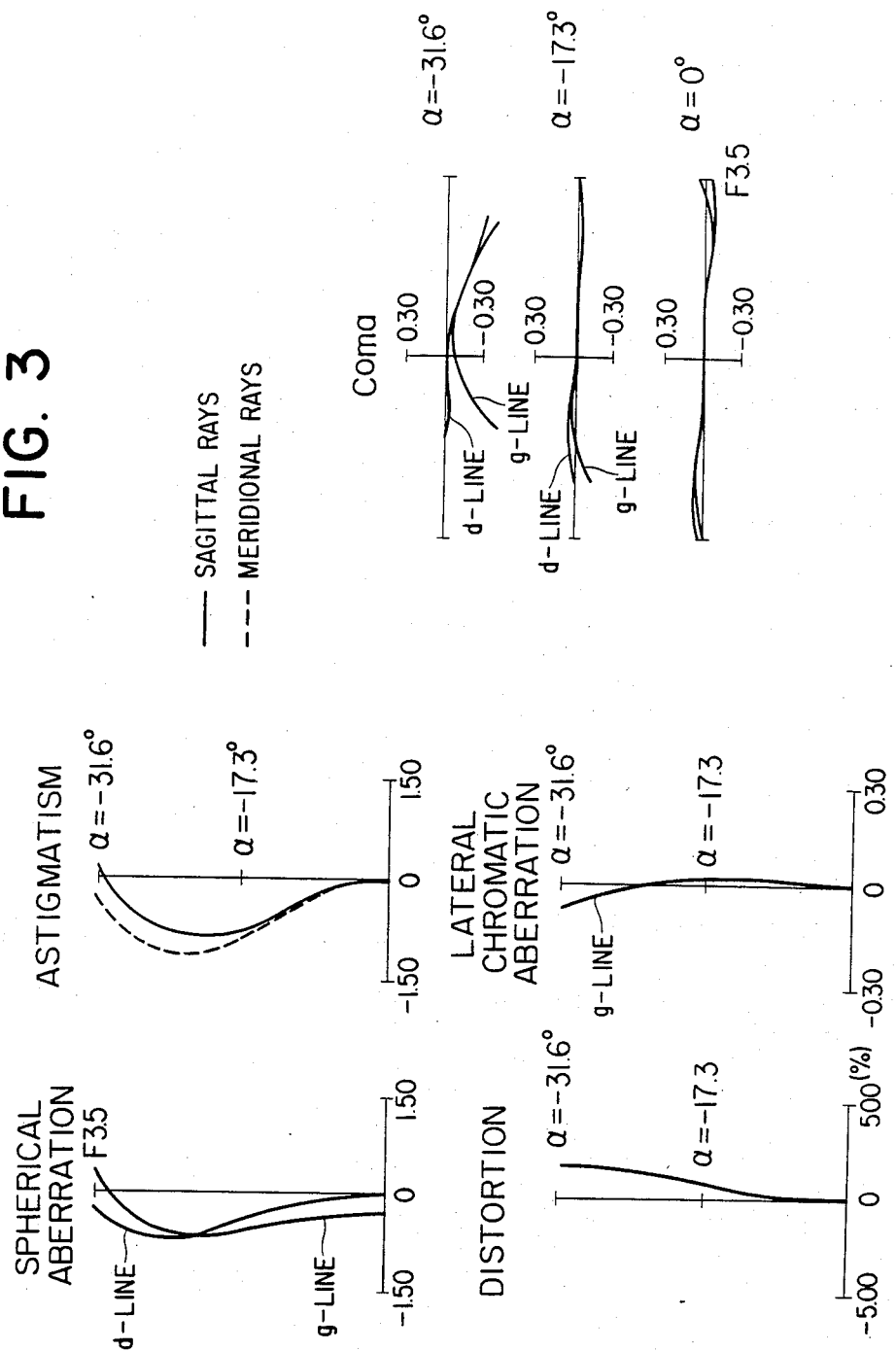
Figure 4:
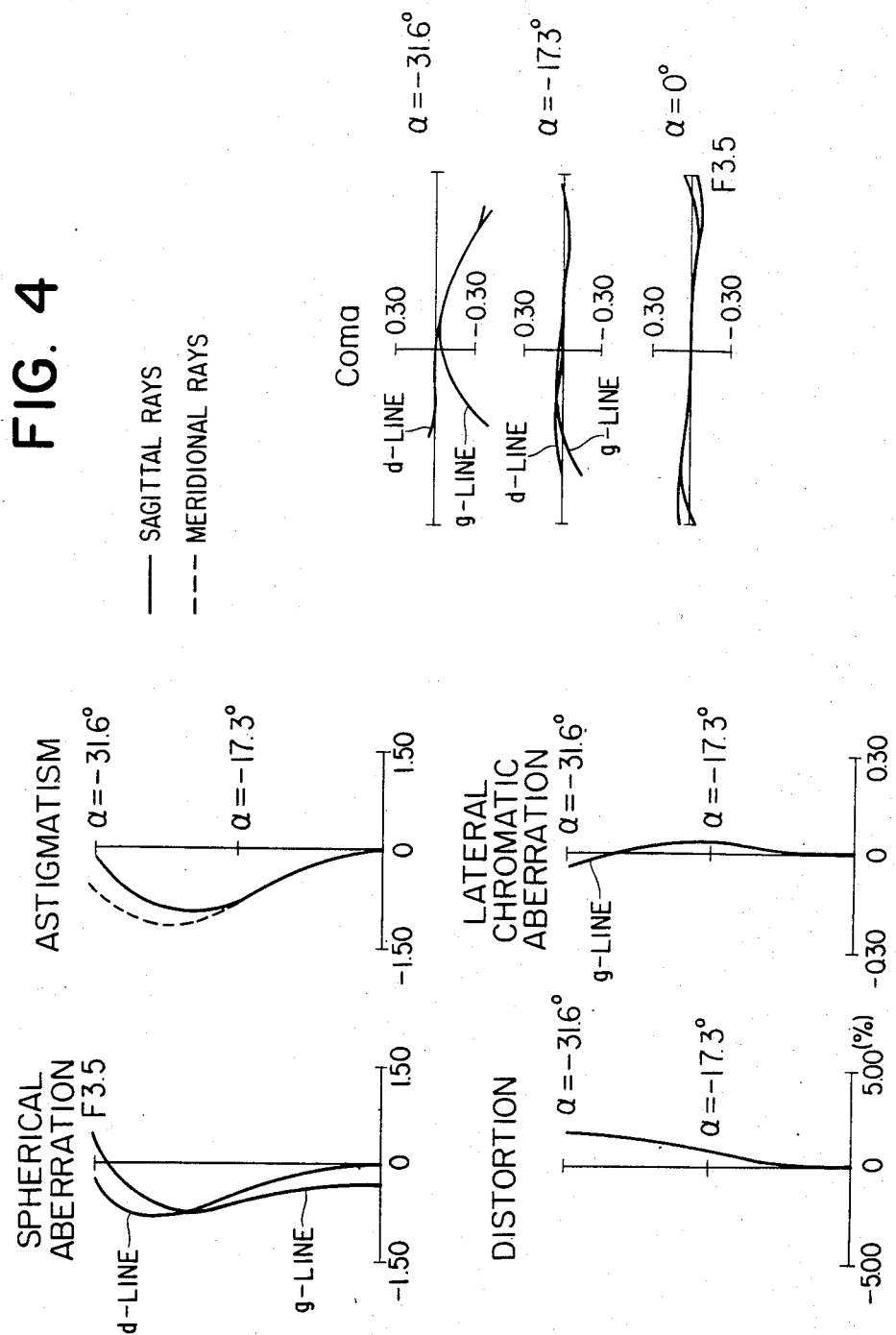
Figure 5:
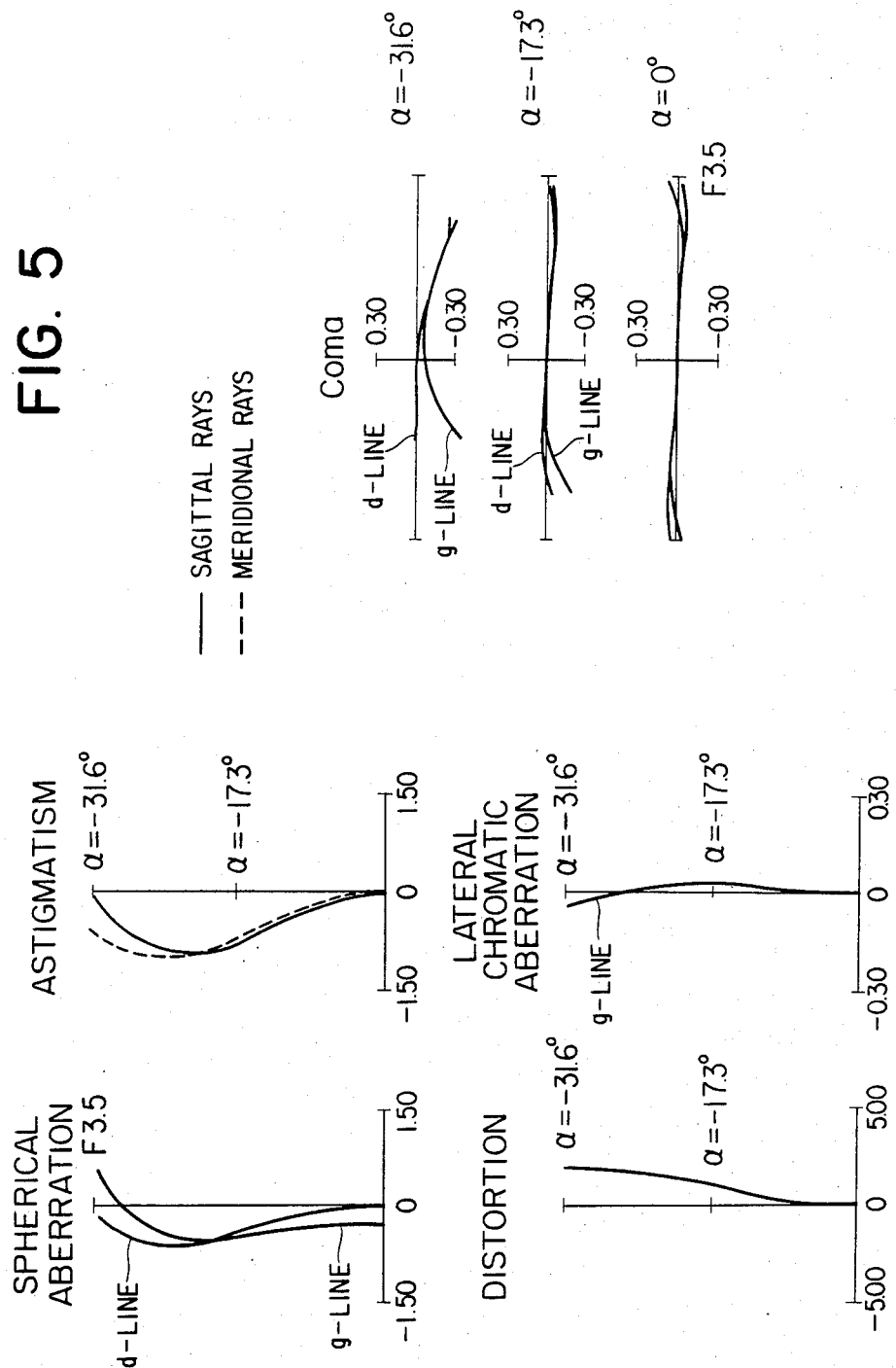

The behind stop lens according to the present invention, as shown in FIG. 1, has, in succession from the object side, a first lens $L_1$ which is a positive meniscus lens having its convex surface facing the object side, a second lens $L_2$ which is a biconcave negative lens, a third lens $L_3$ which is a biconvex positive lens, and a fourth lens $L_4$ which is a negative meniscus lens having its convex surface facing the image side, the third lens and the fourth lens being cemented together to form a positive cemented lens, and this behind stop lens satisfies the following conditions:

$$\Sigma d < 0.29f \quad (1)$$
$$0.05 < n_3 - n_4 < 0.18 \quad (2)$$
$$-0.35f < r_6 < -0.22f \quad (3)$$
$$0.57f < r_5 < 0.73f \quad (4)$$
$$\nu_4 - \nu_3 > 6 \quad (5)$$

$$\left.\begin{array}{l} 48.0 < \nu_3 < 49.6 \\ 30.0 < \nu_2 < 33.0 \end{array}\right\} \quad (6)$$

$$0.25f < r_1 < 0.31f \quad (7)$$
$$-0.38f < f_2 < -0.30f \quad (8)$$

where f represents the total focal length of the entire system, $\Sigma d$ represents the distance from the vertex of the object side lens surface of the first lens to the vertex of the image side lens surface of the fourth lens, $f_2$ represents the focal length of the second lens, r represents the radius of curvature of each lens surface, n and $\nu$ represent the refractive index and the Abbe number, respectively, of each lens, and the subscript numbers mean the order from the object side.

In FIG. 1, the states of the light flux from an infinity on-axis object point and the light flux from an infinity off-axis object point having a maximum angle of view are shown to help in understanding the present invention.

The conditions of the present invention will hereinafter be described in detail. Condition (1) prescribes the center thickness of the entire lens system, and it is a condition for sufficiently securing the quantity of marginal light and correcting coma well. That is, in the behind stop lens, the quantity of marginal light is determined by the aperture of the lens which is most adjacent to the object side and to make the aperture of the foremost lens small to some degree, it is necessary to sufficiently secure the quantity of marginal light by making the thickness of the entire lens small. In the present invention, if condition (1) is departed from, the quantity of light of the light flux of the oblique light flux which is below the principal light ray will be deficient and further, the oblique light flux will pass through the first lens $L_1$ at a position far from the optical axis and therefore, the coma occurring thereat will be great and it will be difficult to effect good correction even if the burden of correction in the subsequent lens surfaces is increased.

Condition (2) is a condition for well correcting coma, particularly the coma of the light rays of the oblique light flux which pass below the principal light ray. Generally, in a Tessar type lens, the influence of the negative second lens thereof acts intensely so that the light rays below the principal light ray, particularly, the light rays in the marginal portion are liable to become divergent and remain as coma. Therefore, by using a positive lens as the third lens, cementing it to the fourth lens as a negative lens, making the refractive index of the positive lens which is the third lens moderately high as compared with the refractive index of the negative lens which is the fourth lens, making the radius of curvature $r_6$ of the cemented surface convex toward the image side which is formed by these lenses into a moderate value, and endowing this surface with an intense converging action, the residual aberration attributable to the aforementioned divergent oblique light flux can be well corrected with respect to the light flux below the principal light ray. If the lower limit of condition (2) is exceeded, the difference in refractive index will become too small and the converging action by the cemented surface $r_6$ will become insufficient, so that the occurrence of coma peculiar to the Tessar type lens will become substantial as mentioned above and correction thereof will be difficult. Conversely, if the upper limit of condition (2) is exceeded, the converging action by the cemented surface $r_6$ will work too intensely and it will be impossible to correct coma with good balance.

Making the radius of curvature $r_6$ of the cemented surface of the third lens $L_3$ and the fourth lens $L_4$ small results in more intensely converging the light rays passing below the principal light ray of an oblique light flux, particularly the light rays passing through the marginal portion of the lens, and contributes to better correcting coma. If the lower limit of condition (3) is exceeded, the radius of curvature of the cemented surface $r_6$ will become greater and therefore, as described above, the converging action in the marginal portion of the lens will become smaller and better correction of coma will not be accomplished. However, if the upper limit of condition (3) is exceeded, the radius of curvature of the cemented surface $r_6$ will become smaller and therefore, the converging action in the marginal portion of the lens will become excessively great and coma will be aggravated and may not be corrected. Condition (4) is a condition for well correcting particularly the coma with respect to the upper light flux relative to the principal light ray. The object side surface of the third lens $L_3$ (the fifth surface) has the function of converging light rays by having the convex surface facing the object side, but due to the fact that the angle of incidence at which the upper light ray relative to the principal light ray is incident on the fifth surface is sharper than the angle of incidence at which the lower light ray is incident on the fifth surface, the function of converging the upper light ray relative to the principal light ray is more intense. Accordingly, by keeping the radius of curvature $r_5$ of the object side surface of the third lens $L_3$ at a suitable value, it is possible to well correct coma, particularly, the coma of the upper light flux relative to the principal light ray. If the upper limit of condition (4) is exceeded, the radius of curvature $r_5$ will become great, whereby the converging action in the fifth surface will become too weak. If the lower limit of condition (4) is exceeded, the radius of curvature $r_5$ will become small, whereby the converging action in the fifth surface will become too intense. In any of these cases, coma cannot be well corrected.

Condition (5) is a condition for correcting chromatic aberration of coma, particularly the chromatic aberration of coma of the oblique light ray incident from below the principal light ray which intensely affects the imaging performance in the behind stop lens. Generally, the chromatic aberration of coma in a Tessar type lens is intensely affected by a flint system negative lens as the second lens $L_2$. That is, light rays of short wavelength are subjected to a more intense diverging action by the second lens than light rays of long wavelength, whereby chromatic aberration of coma occurs. Condition (5) is for correcting the chromatic aberration of coma with respect to the lower light flux relative to the principal light ray created in the second lens by more intense divergence, by being also subjected to an intense converging action by the cemented lens. That is, glass of high dispersion is used for the positive lens $L_3$ which is the third lens forming the cemented lens and glass of low dispersion is used for the negative lens $L_4$ which is the fourth lens, whereby the light rays on the short wavelength side are more intensely converged under conditions (2) and (3) to thereby correct chromatic aberration of coma well. If this condition is not satisfied, chromatic aberration of coma will remain and may not be sufficiently corrected.

Condition (6) is a condition for correcting both chromatic aberration of coma and longitudinal chromatic aberration. Reducing the occurrence of chromatic aberration of coma of the light ray below the principal light ray in an oblique light flux is accomplished by using glass of lower dispersion for the negative lens $L_2$ as the second lens to minimize the diverging action of light rays of short wavelength and using glass of higher dispersion for the positive lens $L_3$ as the third lens to intensify the converging action. For this purpose, it is necessary that condition (5) be satisfied and at the same time, that the Abbe number $\nu_3$ of the positive third lens $L_3$ not exceed the upper limit of condition (6) and the Abbe number $\nu_2$ of the negative second lens $L_2$ not exceed the lower limit of condition (6). When $\nu_3$ exceeds the upper limit and when $\nu_2$ exceeds the lower limit, the chromatic aberration of coma of the light flux below the principal light ray will not be sufficiently corrected. Lower dispersion of the negative second lens $L_2$ and higher dispersion of the positive third lens $L_3$ are more desirable for the correction of chromatic aberration of coma, but when $\nu_2$ exceeds the upper limit and the dispersion is low and when $\nu_3$ exceeds the lower limit and the dispersion is high, longitudinal chromatic aberration will be under-corrected and will finally not be corrected. Now, lateral chromatic aberration is intensely affected by the first lens $L_1$ in which the principal light ray which is an oblique light ray is refracted at a position farthest from the optical axis and the second lens $L_2$ of high dispersion. In the lens of the present invention, the second lens $L_2$ has a negative power of high dispersion as shown by condition (6) and therefore, light rays of short wavelength are caused to diverge more intensely by the second lens. To keep the lateral chromatic aberration by such divergence good, it is desirable that the Abbe number $\nu_1$ of the first lens $L_1$ which intensely affects the lateral chromatic aberration be $45.0 < \nu_1 < 57.0$.

Condition (7) is a condition for correcting spherical aberration. If the radius of curvature $r_1$ of the object side surface of the first lens $L_1$ exceeds the upper limit of this condition, the converging action in this surface will become weak and spherical aberration will occur in the positive sense and will not be corrected. On the other hand, if the radius of curvature $r_1$ exceeds the lower limit of this condition, the converging action in the object side surface of the first lens $L_1$ will become too intense and therefore, spherical aberration will become negative and good correction thereof will be difficult even by a combination of this lens surface with other lens surface.

Condition (8) is a condition for well correcting astigmatism. The image plane is under-corrected by the positive first lens $L_1$ and the positive lens comprising the third and fourth lenses $L_3$ and $L_4$ cemented together, but over-corrected curvature of image field is caused to occur by the negative lens $L_2$ as the second lens to thereby correct the image plane with good balance as a whole. If the upper limit of condition (8) is exceeded, the refractive power of the negative second lens $L_2$ will become too strong and over-corrected curvature of image field will occur. On the other hand, if the lower limit of condition (8) is exceeded, the refractive power of the negative second lens $L_2$ will be too weak and therefore, curvature of image field will be undercorrected.

To correct Petzval sum well, it is desirable that the condition that $n_2 < 1.69$ be satisfied with regard to the refractive index $n_2$ of the negative second lens $L_2$ and the condition that $n_1 > 1.72$ be satisfied with regard to the refractive index $n_1$ of the positive first lens $L_1$. Outside these conditions, Petzval sum will be excessively great in the positive sense and this is disadvantageous for good correction.

The numerical data of first to fourth embodiments of the present invention will be shown below. In the tables below, r represents the radius of curvature of each lens surface, d represents the center thickness and the air space of each lens, n and $\nu$ represent the refractive index and the Abbe number, respectively, of each lens, and the subscript numbers mean the order from the object side.

| First Embodiment | | | |
|---|---|---|---|
| $f = 100$  F 3.5 | | | |
| $r_1 = 27.6354$ | $d_1 = 7.8261$ | $n_1 = 1.77279$ | $\nu_1 = 49.44$ $L_1$ |
| $r_2 = 72.7567$ | $d_2 = 2.8116$ | | |
| $r_3 = -241.1541$ | $d_3 = 2.6087$ | $n_2 = 1.68893$ | $\nu_2 = 31.15$ $L_2$ |
| $r_4 = 25.7172$ | $d_4 = 3.6232$ | | |
| $r_5 = 71.2175$ | $d_5 = 7.8261$ | $n_3 = 1.74443$ | $\nu_3 = 49.46$ $L_3$ |
| $r_6 = -23.1983$ | $d_6 = 2.3188$ | $n_4 = 1.67025$ | $\nu_4 = 57.58$ $L_4$ |
| $r_7 = -133.1722$ | | | |
| $\Sigma d = 27.0145$ | | | |
| $n_3 - n_4 = 0.07418$ | | | |
| $\nu_4 - \nu_3 = 8.12$ | | | |
| $f_2 = -33.6$ | | | |

| Second Embodiment | | | |
|---|---|---|---|
| $f = 100$  F 3.5 | | | |
| $r_1 = 27.7209$ | $d_1 = 7.8242$ | $n_1 = 1.77279$ | $\nu_1 = 49.44$ $L_1$ |
| $r_2 = 71.8523$ | $d_2 = 2.8979$ | | |
| $r_3 = -234.1553$ | $d_3 = 2.6081$ | $n_2 = 1.68893$ | $\nu_2 = 31.15$ $L_2$ |
| $r_4 = 25.7370$ | $d_4 = 3.6223$ | | |
| $r_5 = 68.3140$ | $d_5 = 7.8242$ | $n_3 = 1.74443$ | $\nu_3 = 49.46$ $L_3$ |
| $r_6 = -26.6718$ | $d_6 = 2.3183$ | $n_4 = 1.62041$ | $\nu_4 = 60.35$ $L_4$ |
| $r_7 = -181.0863$ | | | |
| $\Sigma d = 27.0950$ | | | |
| $n_3 - n_4 = 0.12402$ | | | |
| $\nu_4 - \nu_3 = 10.89$ | | | |
| $f_2 = -33.5$ | | | |

| Third Embodiment | | | |
|---|---|---|---|
| $f = 100$  F 3.5 | | | |
| $r_1 = 26.8493$ | $d_1 = 7.2464$ | $n_1 = 1.74443$ | $\nu_1 = 49.46$ $L_1$ |
| $r_2 = 69.5130$ | $d_2 = 2.7536$ | | |
| $r_3 = -243.6638$ | $d_3 = 3.1884$ | $n_2 = 1.67270$ | $\nu_2 = 32.16$ $L_2$ |
| $r_4 = 25.0290$ | $d_4 = 3.4783$ | | |
| $r_5 = 63.3130$ | $d_5 = 7.5362$ | $n_3 = 1.74443$ | $\nu_3 = 49.46$ $L_3$ |
| $r_6 = -27.4261$ | $d_6 = 2.3188$ | $n_4 = 1.61025$ | $\nu_4 = 56.66$ $L_4$ |
| $r_7 = -238.5099$ | | | |
| $\Sigma d = 26.5217$ | | | |
| $n_3 - n_4 = 0.13418$ | | | |
| $\nu_4 - \nu_3 = 7.20$ | | | |
| $f_2 = -33.6$ | | | |

| Fourth Embodiment | | | |
|---|---|---|---|
| $f = 100$  F 3.5 | | | |
| $r_1 = 29.0490$ | $d_1 = 7.2463$ | $n_1 = 1.77279$ | $\nu_1 = 49.44$ $L_1$ |
| $r_2 = 72.4370$ | $d_2 = 2.8985$ | | |
| $r_3 = -199.3606$ | $d_3 = 4.5991$ | $n_2 = 1.68893$ | $\nu_2 = 31.15$ $L_2$ |
| $r_4 = 27.7180$ | $d_4 = 3.2733$ | | |
| $r_5 = 68.1066$ | $d_5 = 6.3339$ | $n_3 = 1.77279$ | $\nu_3 = 49.44$ $L_3$ |
| $r_6 = -30.2983$ | $d_6 = 2.3188$ | $n_4 = 1.62041$ | $\nu_4 = 60.35$ $L_4$ |
| $r_7 = -208.3312$ | | | |
| $\Sigma d = 26.6699$ | | | |
| $n_3 - n_4 = 0.15238$ | | | |
| $\nu_4 - \nu_3 = 10.91$ | | | |
| $f_2 = -35.0$ | | | |

The various aberrations in the first to fourth embodiments are shown in FIGS. 2 to 5, respectively. Spherical aberration, astigmatism, distortion, lateral chromatic aberration and coma are shown in each of the aberration graphs. The standard wavelength is d-line ($\lambda = 587.6$ nm) and g-line ($\lambda = 435.8$ nm) is used to represent chromatic aberration.

From the aberration graphs, it is apparent that in each of the embodiments, coma is well corrected and each of the embodiments is excellent in balance of aberrations.

As described above, according to the present invention, a behind stop lens is achieved which has an angle of view of 60° or more and F-number of the order of 3.5 and yet has a good aberration balance and an excellent imaging performance.

I claim:

1. A behind stop lens having an angle of view of 60 degrees or more and brightness of the order of F3.5 in which aberrations, especially coma and chromatic aberration, are well corrected including, in succession from the object side, a first lens which is a positive meniscus lens having its convex surface facing the object side, a second lens which is a biconcave negative lens, a third lens which is a biconvex positive lens, and a fourth lens which is a negative meniscus lens having its convex surface facing the image side, said third lens and said fourth lens being cemented together to form a positive cemented lens, the dispersion of said third lens being higher than that of said fourth lens so as to correct coma and chromatic aberration, said behind stop lens satisfying the following conditions:

$$\Sigma d < 0.29f \quad (1)$$
$$0.05 < n_3 - n_4 < 0.18 \quad (2)$$
$$0.35f < r_6 < -0.22f \quad (3)$$
$$0.57f < r_5 < 0.73f \quad (4)$$
$$\nu_4 - \nu_3 > 6 \quad (5)$$

$$\left. \begin{array}{l} 48.0 < \nu_3 < 49.6 \\ 30.0 < \nu_2 < 33.0 \end{array} \right\} \quad (6)$$

$$0.25f < r_1 < 0.31f \quad (7)$$
$$-0.38f < f_2 < -0.30f \quad (8)$$

where f represents the total focal length of the entire system, $\Sigma d$ represents the distance from the vertex of the object side lens surface of said first lens to the vertex of the image side lens surface of said fourth lens, $f_2$ represents the focal length of said second lens, r represents the radius of curvature of each lens surface, n and $\nu$ represents the refractive index and the Abbe number, respectively, of each lens, and the subscript numbers mean the order from the object side.

2. A behind stop lens according to claim 1, further satisfying the following conditions:

$$45.0 < \nu_1 < 57.0$$

$n_1 > 1.72$
$n_2 < 1.69$ where $\nu_1$ is the Abbe number of said first lens, $n_1$ is the refractive index of said first lens and $n_2$ is the refractive index of said second lens.

3. A behind stop lens according to claim 2, wherein numerical data are as follows:

| f = 100 F 3.5 | | | |
|---|---|---|---|
| $r_1 = 27.6354$ | $d_1 = 7.8261$ | $n_1 = 1.77279$ | $\nu_1 = 49.44$ L$_1$ |
| $r_2 = 72.7567$ | $d_2 = 2.8116$ | | |
| $r_3 = -241.1541$ | $d_3 = 2.6087$ | $n_2 = 1.68893$ | $\nu_2 = 31.15$ L$_2$ |
| $r_4 = 25.7172$ | $d_4 = 3.6232$ | | |
| $r_5 = 71.2175$ | $d_5 = 7.8261$ | $n_3 = 1.74443$ | $\nu_3 = 49.46$ L$_3$ |
| $r_6 = -23.1983$ | $d_6 = 2.3188$ | $n_4 = 1.67025$ | $\nu_4 = 57.58$ L$_4$ |
| $r_7 = -133.1722$ | | | |
| | $\Sigma d = 27.0145$ | | |
| | $n_3 - n_4 = 0.07418$ | | |
| | $\nu_4 - \nu_3 = 8.12$ | | |
| | $f_2 = -33.6$ | | | where r represents the radius of curvature of each lens surface, d represents the center thickness and the air space of each lens, n and $\nu$ represent the refractive index and the Abbe number, respectively, of each lens, and the subscript numbers mean the order from the object side.

4. A behind stop lens according to claim 2, wherein numerical data are as follows:

| f = 100 F 3.5 | | | |
|---|---|---|---|
| $r_1 = 27.7209$ | $d_1 = 7.8242$ | $n_1 = 1.77279$ | $\nu_1 = 49.44$ L$_1$ |
| $r_2 = 71.8523$ | $d_2 = 2.8969$ | | |
| $r_3 = -234.1553$ | $d_3 = 2.6081$ | $n_2 = 1.68893$ | $\nu_2 = 31.15$ L$_2$ |
| $r_4 = 25.7370$ | $d_4 = 3.6223$ | | |
| $r_5 = 68.3140$ | $d_5 = 7.8242$ | $n_3 = 1.74443$ | $\nu_3 = 49.46$ L$_3$ |
| $r_6 = -26.6718$ | $d_6 = 2.3183$ | $n_4 = 1.62041$ | $\nu_4 = 60.35$ L$_4$ |
| $r_7 = -181.0863$ | | | |
| | $\Sigma d = 27.0950$ | | |
| | $n_3 - n_4 = 0.12402$ | | |
| | $\nu_4 - \nu_3 = 10.89$ | | |
| | $f_2 = -33.5$ | | | where r represents the radius of curvature of each lens surface, d represents the center thickness and the air space of each lens, n and $\nu$ represent the refractive index and the Abbe number, respectively, of each lens, and the subscript numbers means the order from the object side.

5. A behind stoplens according to claim 2, wherein numerical data are as follows:

| f = 100 F 3.5 | | | |
|---|---|---|---|
| $r_1 = 26.8493$ | $d_1 = 7.2464$ | $n_1 = 1.74443$ | $\nu_1 = 49.46$ L$_1$ |
| $r_2 = 69.5130$ | $d_2 = 2.7536$ | | |
| $r_3 = -243.6638$ | $d_3 = 3.1884$ | $n_2 = 1.67270$ | $\nu_2 = 32.16$ L$_2$ |
| $r_4 = 25.0290$ | $d_4 = 3.4783$ | | |
| $r_5 = 63.3130$ | $d_5 = 7.5362$ | $n_3 = 1.74443$ | $\nu_3 = 49.46$ L$_3$ |
| $r_6 = -27.4261$ | $d_6 = 2.3188$ | $n_4 = 1.61025$ | $\nu_4 = 56.66$ L$_4$ |
| $r_7 = -238.5099$ | | | |
| | $\Sigma d = 26.5217$ | | |
| | $n_3 - n_4 = 0.13418$ | | |
| | $\nu_4 - \nu_3 = 7.20$ | | |
| | $f_2 = -33.6$ | | | where r represents the radius of curvature of each lens surface, d represents the center thickness and the air space of each lens, n and $\nu$ represents the refractive index and the Abbe number, respectively, of each lens, and the subscript numbers mean the order from the object side.

6. A behind stop lens according to claim 2, wherein numberical data are as follows:

| f = 100 F 3.5 | | | |
|---|---|---|---|
| $r_1 = 29.0490$ | $d_1 = 7.2463$ | $n_1 = 1.77279$ | $\nu_1 = 49.44$ L$_1$ |
| $r_2 = 72.4370$ | $d_2 = 2.8985$ | | |
| $r_3 = -199.3606$ | $d_3 = 4.5991$ | $n_2 = 1.68893$ | $\nu_2 = 31.15$ L$_2$ |
| $r_4 = 27.7180$ | $d_4 = 3.2733$ | | |
| $r_5 = 68.1066$ | $d_5 = 6.3339$ | $n_3 = 1.77279$ | $\nu_3 = 49.44$ L$_3$ |
| $r_6 = -30.2983$ | $d_6 = 2.3188$ | $n_4 = 1.62041$ | $\nu_4 = 60.35$ L$_4$ |
| $r_7 = -208.3312$ | | | |
| | $\Sigma d = 26.6699$ | | |
| | $n_3 - n_4 = 0.15238$ | | |
| | $\nu_4 - \nu_3 = 10.91$ | | |
| | $f_2 = -35.0$ | | | where r represents the radius of curvature of each lens surface, d represents the center thickness and the air space of each lens, n and $\nu$ represent the refractive index and the Abbe number, respectively, of each lens, and the subsript numbers mean the order from the object side.

* * * * *